Patented July 5, 1949

2,475,569

UNITED STATES PATENT OFFICE 2,475,569

SUBSTITUTED PYRIDINE COMPOUND

John Halley Mowat, Pearl River, N. Y., assignor, by mesne assignments, to American Cyanamid Company, New York, N. Y., a corporation of Maine No Drawing. Application February 7, 1944, Serial No. 521,432

4 Claims. (Cl. 260—295)

This invention relates to a new chemical compound, more particularly to a substituted pyridine, a useful intermediate in the preparation of vitamin $B_6$, and to a process of preparing the same.

The compound of the present invention may be represented by the following formula:

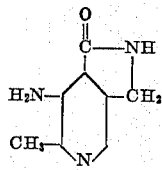

The preparation of this new compound will be illustrated in detail in conjunction with the following specific example.

A solution of 0.25 g. of 2-methyl-3-amino-4-carbethoxy-5-cyano-6-chloropyridine in 150 cc. of methanol containing 1 g. of hydrogen chloride was added, during 18 hours, to a suspension of 1 g. of reduced palladium chloride in 25 cc. of methanol and 2.5 cc. of water. The catalyst was filtered off, the solvent was distilled in vacuo from the filtrate (bath temperature, 40° C.), the oily residue was dissolved in a little methanol; and the solution, diluted with ether, deposited the dihydrochloride of 2 - methyl - 3 - amino - 4 - carbethoxy - 5 - aminomethyl pyridine, which was recrystallized from a glacial acetic acid-ether solution. The dihydrochloride did not melt below 325° C., nor was there evidence of change at this temperature.

Obviously, any 4-carboxy-6-halopyridine may be used so long as the other essential groupings are present on the pyridine ring; for example, the ethyl ester employed in the specific example may be replaced by any other suitable ester of 2-methyl - 3-amino - 4 - carboxy - 5 - cyano - 6 - halopyridine. Among the various esters that may be utilized in addition to the ethyl ester are those such as the methyl, butyl, cinnamyl, cyclohexanol, furfuryl, tetrahydrofurfuryl, and the like. Similarly, it is understood that the corresponding esters of 2-methyl-3-amino-4-carboxy-5-cyano-6-bromopyridine may be used instead of the 6-chloropyridine.

A solution of 0.075 g. of the dihydrochloride of 2-methyl - 3 - amino - 4 - carbethoxy - 5 - aminomethyl pyridine in 1 cc. of water was made basic with aqueous potassium hydroxide and deposited the lactam of 2-methyl-3-amino-4-carboxy-5-aminomethyl pyridine which, recrystallized from 30 per cent aqueous methanol, melted at 242–243° C. with decomposition.

In the formation of the lactam above the dihydrochloride salt was used, but other acid salts may be used such as dihydrobromide, sulfate, etc. Similarly, the potassium hydroxide may be replaced by other bases sufficiently strong to remove the acid salt-forming group, thus allowing the lactam formation to take place. Ammonia, sodium hydroxide, and other basic substances such as sodium carbonate, trisodium phosphate, etc., including amines such as diethylamine, dipropylamine, etc., may be used.

It is obvious that the above description and example are intended to be illustrative only and that they may be varied or modified to a considerable extent within the skill of the art without departing from the spirit of the invention.

What I claim is:

1. The process for the production of the lactam of 2-methyl-3-amino-4-carboxy-5 - aminomethyl pyridine which comprises mixing an acid salt of 2 - methyl - 3 - amino - 4 - carbethoxy - 5 - aminomethyl pyridine with an aqueous solution of a base and recovering the said lactam therefrom.

2. The process for the production of the lactam of 2-methyl - 3 - amino - 4 - carboxy - 5-aminomethyl pyridine which comprises mixing 2-methyl-3-amino-4 - carbethoxy-5 - aminomethyl pyridine dihydrochloride with an aqueous solution of potassium hydroxide and recovering the said lactam therefrom.

3. The process for the production of the lactam of 2-methyl-3-amino-4-carboxy-5-aminomethyl pyridine which comprises mixing 2-methyl - 3 - amino - 4 - carbethoxy - 5 - aminomethyl pyridine dihydrochloride with an aqueous solution of sodium hydroxide and recovering the said lactam therefrom.

4. The process for the production of the lactam of 2 - methyl - 3 - amino - 4 - carboxy-5-aminomethyl pyridine which comprises mixing a diacid salt of 2-methyl-3-amino-4-carbalkoxy-5-aminomethyl pyridine with an aqueous solution of a base and recovering the said lactam therefrom.

JOHN HALLEY MOWAT.

REFERENCES CITED

The following references are of record in the file of this patent:

UNITED STATES PATENTS

| Number | Name | Date |
|---|---|---|
| 2,248,078 | Harris | July 8, 1941 |

OTHER REFERENCES

J. of Organic Chemistry (1942), pages 286–296. (Copy in P. O. Library.)

Ichiba, Science Papers of Inst. of Phys. and Chemical Research, vol. 38 (1941), pages 347–352. (Copy in Library of Congress.)